(12) United States Patent
Smith et al.

(10) Patent No.: US 9,963,085 B2
(45) Date of Patent: May 8, 2018

(54) METHOD FOR RELOCATING VEHICLE BACKUP CAMERA

(71) Applicant: Bus Brown, Inc., Phoenix, AZ (US)

(72) Inventors: Timothy Smith, Dunlap, IA (US); Andrew Fitzgibbon, Woodbine, IA (US); Jason Bush, Woodbine, IA (US)

(73) Assignee: BUS BROWN INC, Phoenix, AZ (US)

( * ) Notice: Subject to any disclaimer, the term of this patent is extended or adjusted under 35 U.S.C. 154(b) by 137 days.

(21) Appl. No.: 15/199,467

(22) Filed: Jun. 30, 2016

(65) Prior Publication Data
US 2017/0050551 A1 Feb. 23, 2017

Related U.S. Application Data

(60) Provisional application No. 62/207,777, filed on Aug. 20, 2015.

(51) Int. Cl.
| | |
|---|---|
| *B60R 11/04* | (2006.01) |
| *B23P 6/00* | (2006.01) |
| *B62D 33/027* | (2006.01) |
| *B60P 1/44* | (2006.01) |
| *B60R 11/00* | (2006.01) |

(52) U.S. Cl.
CPC ............... *B60R 11/04* (2013.01); *B23P 6/00* (2013.01); *B60P 1/44* (2013.01); *B60P 1/4485* (2013.01); *B60R 2011/004* (2013.01); *B62D 33/027* (2013.01); *Y10T 29/4973* (2015.01); *Y10T 29/49716* (2015.01)

(58) Field of Classification Search
CPC ............... B60R 11/04; B60R 2300/108; B60R 2300/8066; B23P 6/00; B62D 33/027; B60P 1/4485; B60P 1/44; Y10T 29/49716; Y10T 29/4973
See application file for complete search history.

(56) References Cited

U.S. PATENT DOCUMENTS

| | | | |
|---|---|---|---|
| 2002/0197142 A1* | 12/2002 | Anderson | B60P 1/44 414/557 |
| 2004/0124659 A1* | 7/2004 | Vaitus | B60J 5/101 296/106 |
| 2006/0171704 A1* | 8/2006 | Bingle | B60R 11/04 396/419 |

OTHER PUBLICATIONS etrailer.com, Backup Camera Relocation Kit for Husky Liners Premium 5th Wheel Louvered Tailgate—Ford Super Duty Husky Liners Accessories and Parts HL15138, Dec. 15, 2013.†
Scottmarlow.net, HID Lighting by Delta Lights JEEP 1-866-761-0974 Free Shipping, Aug. 9, 2013.†
Ford Truck Enthusiasts, Backup Camera With Tommy Lift, Feb. 28, 2011.†

(Continued)

*Primary Examiner* — Jermie Cozart
(74) *Attorney, Agent, or Firm* — Hartman Titus PLC; John D. Titus

(57) ABSTRACT

A liftgate is provided with a modular sensor housing that spans a substantial portion of the width of the liftgate. The sensor housing has a plurality of rearward-facing apertures adapted to permit the cameras and/or proximity sensors from the vehicle to "see" through the housing. The sensor housing incorporates a plurality of sensor mounting brackets specifically adapted to the particular configuration of the vehicle sensors. The modular sensor housing enables a liftgate to be installed without disabling the rearview camera and proximity sensors.

5 Claims, 5 Drawing Sheets

(56) References Cited

OTHER PUBLICATIONS

YouTube.com, sussexinstallations, Mercedes Sprinter 2014 Hope T Bar and Front and Rear Parking Sensors, Jun. 17, 2014.†
Travels with Rocky the Dog, Relocated Back-up Camera, Jun. 19, 2012.†
Ram1500Diesel.com, Moving Backup Camera from Tail Gate, Sep. 16, 2014.†
HeartlandOwners.org, Ford F250 Back Up Camera Relocation, Jan. 28, 2014.†
FJCruiserForums.com, FJ Cruiser 2009 stock (OEM) rear camera location, Nov. 13, 2008.†
TacomaWorld.com, Regarding the backup camera on the tailgate . . . , Jan. 6, 2012.†
RAMForum.com, Relocating back up camera?, May 5, 2014.†

\* cited by examiner
† cited by third party

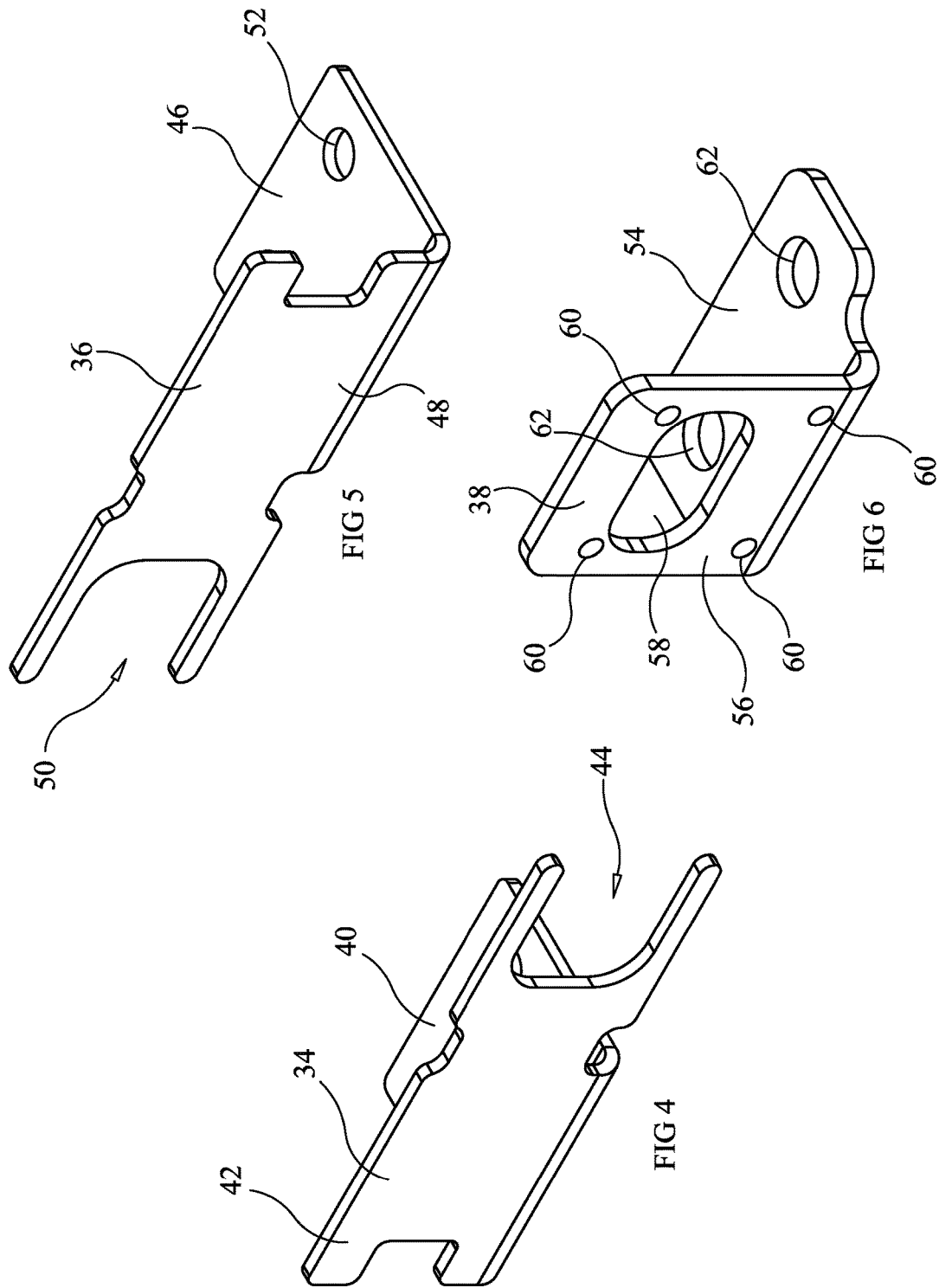

METHOD FOR RELOCATING VEHICLE BACKUP CAMERA

BACKGROUND OF THE INVENTION

This invention relates generally to vehicle lift gates and in particular to safety equipment for vehicle lift gates.

The danger of vehicle back-over accidents, especially those involving children, is well-known. According to statistics from the US National Highway Traffic Safety Administration (NHTSA) on average, there are 210 fatalities and 15,000 injuries per year caused by back-over crashes. NHTSA has found that children under 5 years old account for 31 percent of back-over fatalities each year, and adults 70 years of age and older account for 26 percent. Many of these accidents could have been prevented by installation of a relatively inexpensive backup camera and/or backup sensors.

In light of these statistics, NHTSA has announced a change to federal regulation 49 C.F.R. §571.111, which governs the requirements for vehicle rear view visibility. Under the new rule, all vehicles under 10,000 pounds, including buses and trucks, manufactured on or after May 1, 2018, must be equipped with rear visibility technology that expands the field of view to enable the driver of a motor vehicle to detect areas behind the vehicle. The field of view must include a 10-foot by 20-foot zone directly behind the vehicle. Although the specific technology is not dictated by the new regulations, the clear implication is that all new vehicles manufactured after May 1, 2018 will be equipped with a backup camera, alone or in combination with backup proximity sensors. Many vehicles in use today are already equipped with backup cameras and proximity sensors.

Pickup trucks present a special problem for mounting a backup camera. A camera mounted to the roof of the cab cannot see through the tail gate. Consequently, most modern pickup trucks mount the backup camera and sensors inside the rear bumper or in the tailgate itself. These mounting locations, however, create a new problem if a liftgate is to be installed on the vehicle, since on most pickup trucks, the bumper and tailgate must be removed in order to mount the liftgate.

SUMMARY OF THE INVENTION

The present invention comprises a method and apparatus for relocating the Original Equipment vehicle backup camera(s) and/or proximity sensors when installing a liftgate on a vehicle. According to an illustrative embodiment, a liftgate is provided with a modular sensor housing that spans a substantial portion of the width of the liftgate. The sensor housing has a plurality of rearward-facing apertures adapted to permit the cameras and/or proximity sensors to "see" through the housing. The sensor housing incorporates a plurality of sensor mounting brackets adapted to the particular configuration of the vehicle sensors and camera(s). An illustrative method of installation comprises the steps of removing the camera(s) and/or proximity sensors from the vehicle rear bumper, removing the vehicle tailgate, removing the vehicle rear bumper, mounting the liftgate to the vehicle, mounting the camera(s) and/or proximity sensors that were removed from the bumper to their respective mounting brackets and attaching the mounting brackets to the inside of the modular sensor housing.

BRIEF DESCRIPTION OF THE DRAWING

The present invention will be better understood from a reading of the following detailed description, taken in conjunction with the accompanying drawing figures in which like references designate like elements and, in which:

FIG. 4 is a perspective view of a sensor bracket adapted for use with the modular sensor housing of FIG. 2;

FIG. 5 is a perspective view of a sensor bracket adapted for use with the modular sensor housing of FIG. 2; and FIG. 6 is a perspective view of a sensor bracket adapted for use with the modular sensor housing of FIG. 2.

DETAILED DESCRIPTION

Figure 1:
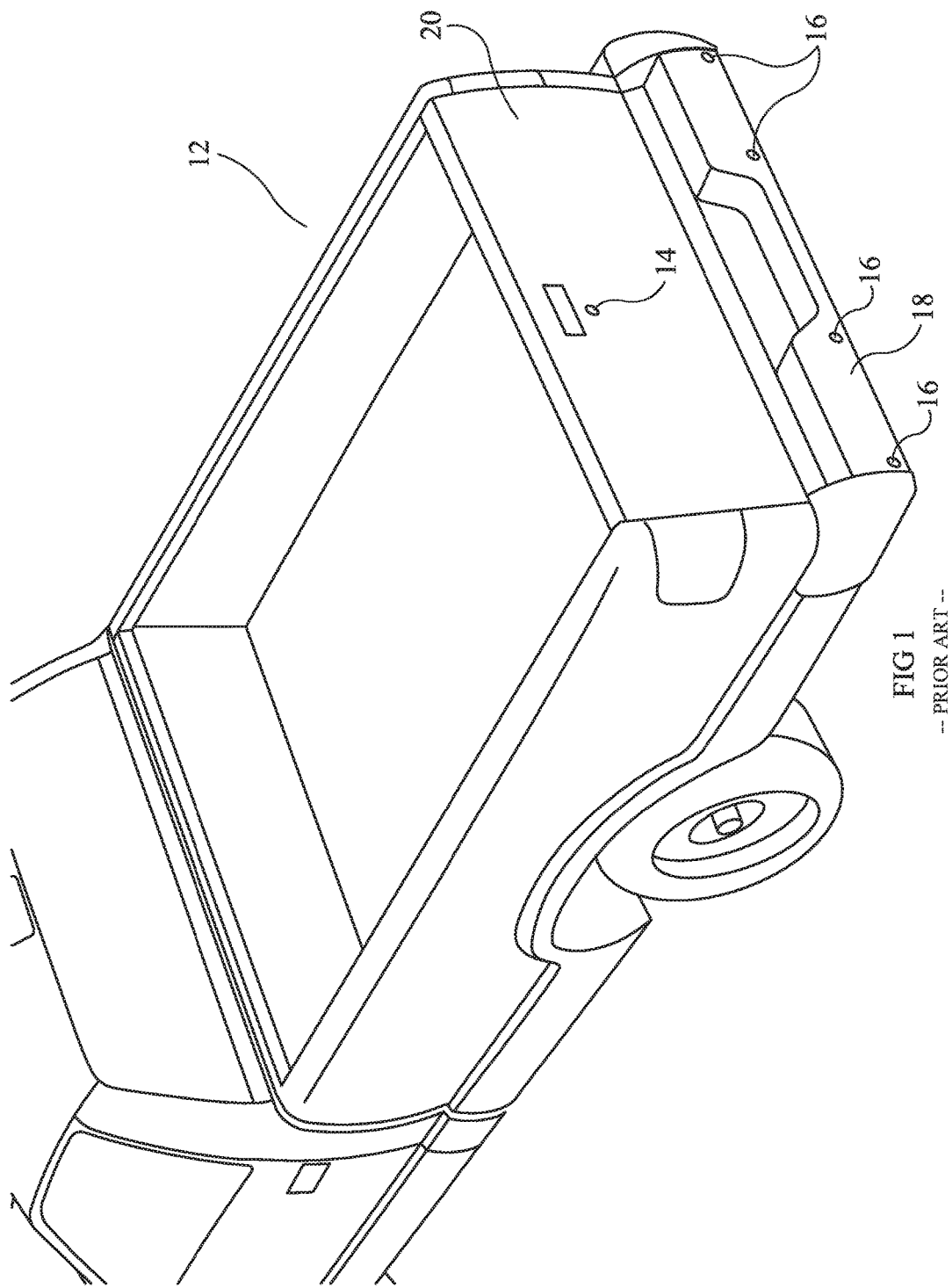
FIG. 1 is a rear perspective view of a prior art vehicle with bumper-mounted rearview camera(s) and proximity sensors.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
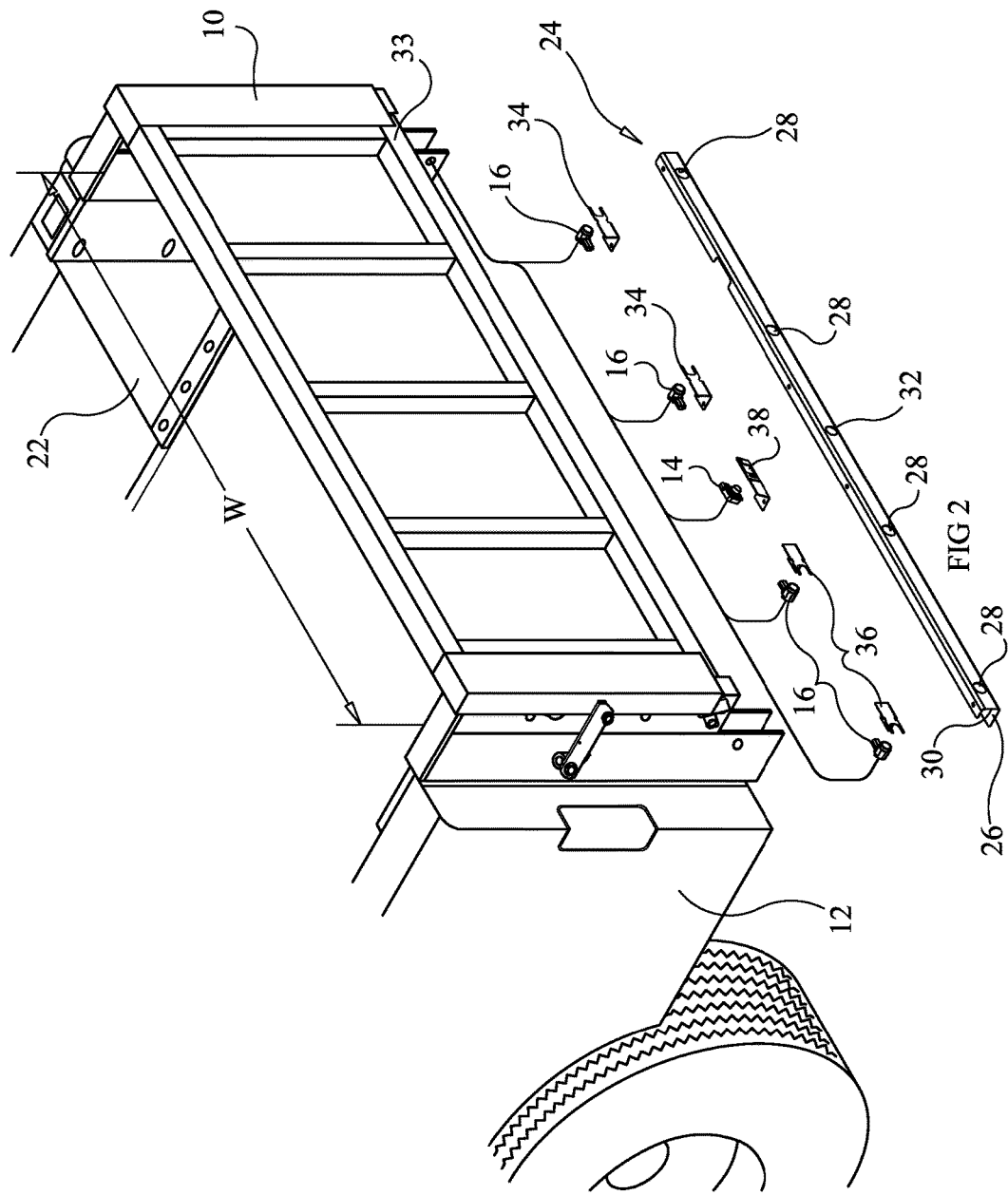
FIG. 2 is an exploded perspective view of a vehicle equipped with a liftgate and modular sensor housing incorporating features of the present invention.
Figure 3:
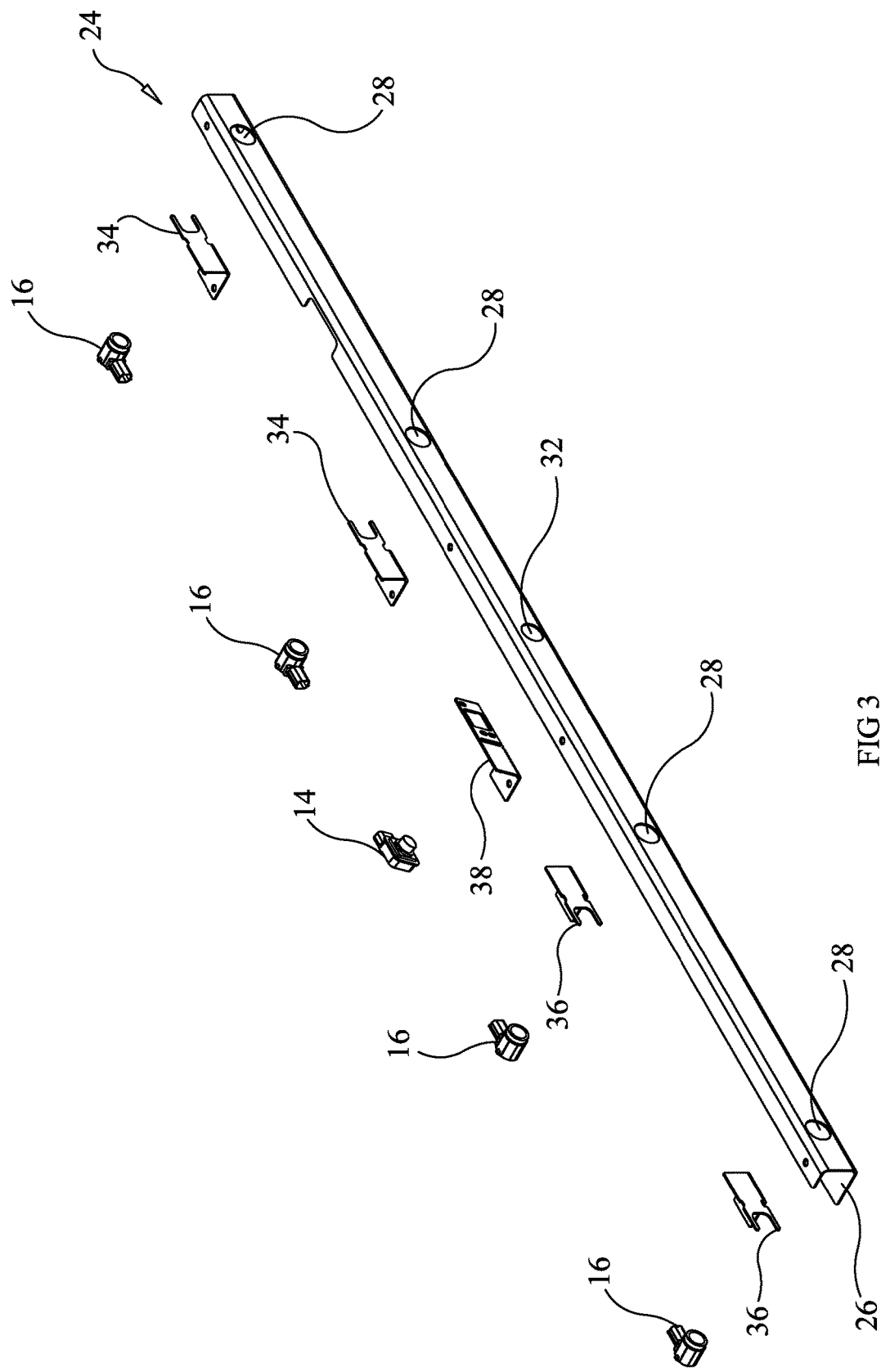
FIG. 3 is an exploded perspective view of the modular sensor housing of FIG. 2.

With reference to FIGS. 1 and 2, vehicle tailgate lifts, also known as liftgates are used in a wide variety of applications from heavy trucks, to vans and light pickups. In FIG. 2, an exemplary liftgate 10 is shown attached to the rear of an exemplary vehicle 12. Liftgate 10, can be any conventional liftgate adapted to be mounted to a vehicle such as a Tommy Gate® G2 liftgate, but in the illustrative embodiment, liftgate 10 comprises a Tommy Gate® standard liftgate. As noted above, many vehicles in use today come equipped with backup cameras and proximity sensors. In the case of vehicle 12, which is typical of many pickup trucks currently equipped with such cameras and sensors, the proximity sensors 16 are mounted inside of the rear bumper assembly 18 and the rearview camera 14 is mounted in the tailgate, so as to have an unobstructed view of the area directly behind the vehicle. Although in the illustrative embodiment the camera 14 is mounted in the tailgate, Original Equipment cameras located by the vehicle manufacturer in the bumper, license plate frame or other locations are contemplated within the scope of the present invention.

As can be determined from FIGS. 1 and 2, in order for liftgate 10 to be attached to vehicle 12, the bumper 18 and tailgate 20 must be removed. With the tailgate and bumper removed, liftgate 10 can be attached to vehicle 12 by means of a right side mounting bracket 22 and a similar left side mounting bracket, which pass through the area that would be otherwise be occupied by the vehicle tailgate 20. Liftgate 10 is also supported by a lower brace (not shown), which passes through the area that would be occupied by the vehicle bumper 18. As can be seen from FIG. 2, with bumper 18 removed, the rearview camera 14 and proximity sensors 16 are left unsupported.

In accordance with the present invention, a modular sensor support 24 provides the necessary mounting platform for the rearview camera 14 and proximity sensors 16. In the illustrative embodiment, the modular sensor support 24 comprises an elongated channel structure 26 that spans a majority of the width "W" of liftgate 10. Channel structure 26 can be made of any suitably rigid material, but in the illustrative embodiment comprises mild steel formed into a channel having unequal length flanges. Modular sensor support 24 includes a plurality of rearward facing apertures 28 formed in the web portion 30 of the channel structure 26. Apertures 28 are adapted to conform to the external contours of the proximity sensors 16. Modular sensor support 24 further comprises a rearward facing aperture 32 adapted to conform to the lens opening of rearview camera 14. Although in the illustrative embodiment, support 24 has a total of 5 apertures, fewer or a greater number of apertures may be provided depending on the particular sensor configuration of the vehicle and/or plugs may be provided to cover over apertures that are not used in a particular configuration. Modular sensor housing 24 may be attached by conventional means (e.g. screws, bolts, or rivets) to the lower frame 32 of liftgate 10.

Different vehicles will have different physical configurations for the various sensors. Accordingly, modular sensor support 24 includes a plurality of individual mounting brackets including right side proximity sensor bracket 34, left side proximity sensor bracket 36 and rearview camera racket 38, each of which is adapted to conform to the particular physical configuration of a set of Original Equipment vehicle sensors. The brackets have a uniform mounting configuration so as to maintain a modular mounting interface with channel structure 26. Although brackets 34, 36 and 38 can be made from any suitable rigid material, in the illustrative embodiment, right side proximity sensor bracket 34 comprises a piece of 14-gauge mild steel formed into a structural angle having a flange 40 approximately 1.36 inches deep and a web 42 approximately 1 inch tall. Web 42 has a C-shaped cutout 44 adapted to receive a proximity sensor from, e.g. a 2015 Chevrolet Colorado pickup truck. Left side proximity sensor bracket 36 similarly comprises a piece of 14-gauge mild steel formed into a structural angle having a flange 46 approximately 1.36 inches deep and a web 48 approximately 1 inch tall. Web 48 has a C-shaped cutout 50 also adapted to receive a proximity sensor from, e.g. a 2015 Chevrolet Colorado pickup truck. Modularity is maintained by ensuring brackets 34 and 36 have mounting holes 52 located such that when mounted to channel structure 26, brackets 34 and 36 locate proximity sensors 16 so that they are lined with apertures 28 in channel structure 26. Camera bracket 38 is similarly formed from 14gauge mild steel formed into a structural angle having a flange 54 approximately 0.925 inch deep and a web 56 approximately 1.17 inches tall. Web 56 has an elongate aperture 58 formed therein adapted to receive the lens of a backup camera from, e.g. a 2015 Chevrolet Colorado pickup truck, which may be mounted by conventional means (e.g. screws, rivets, etc.) via mounting holes 60. Modularity is again maintained by locating mounting holes 62 so that when camera bracket 38 is attached to channel structure 26, the lens of backup camera 14 is aligned with aperture 32 of channel structure 26.

According to an exemplary method of installation, a liftgate is provided with a modular sensor assembly 24, the modular sensor assembly 24 including a channel structure 26 that is adapted to be mounted to the particular liftgate (irrespective of the particular vehicle), the modular sensor assembly 24 also includes a plurality of sensor mounting brackets that are adapted to the particular vehicle. The vehicle proximity sensors are removed from the vehicle rear bumper and the backup camera is removed from the vehicle rear bumper or tailgate. The vehicle tailgate and bumper are removed and the liftgate is attached to the vehicle by means of left side and right side brackets 22, and a lower brace. The channel structure 26 is attached to the liftgate. The vehicle backup camera and sensors are attached to their respective mounting brackets 34, 36, 38, which are then mounted to the channel structure 26.

Figure 7:
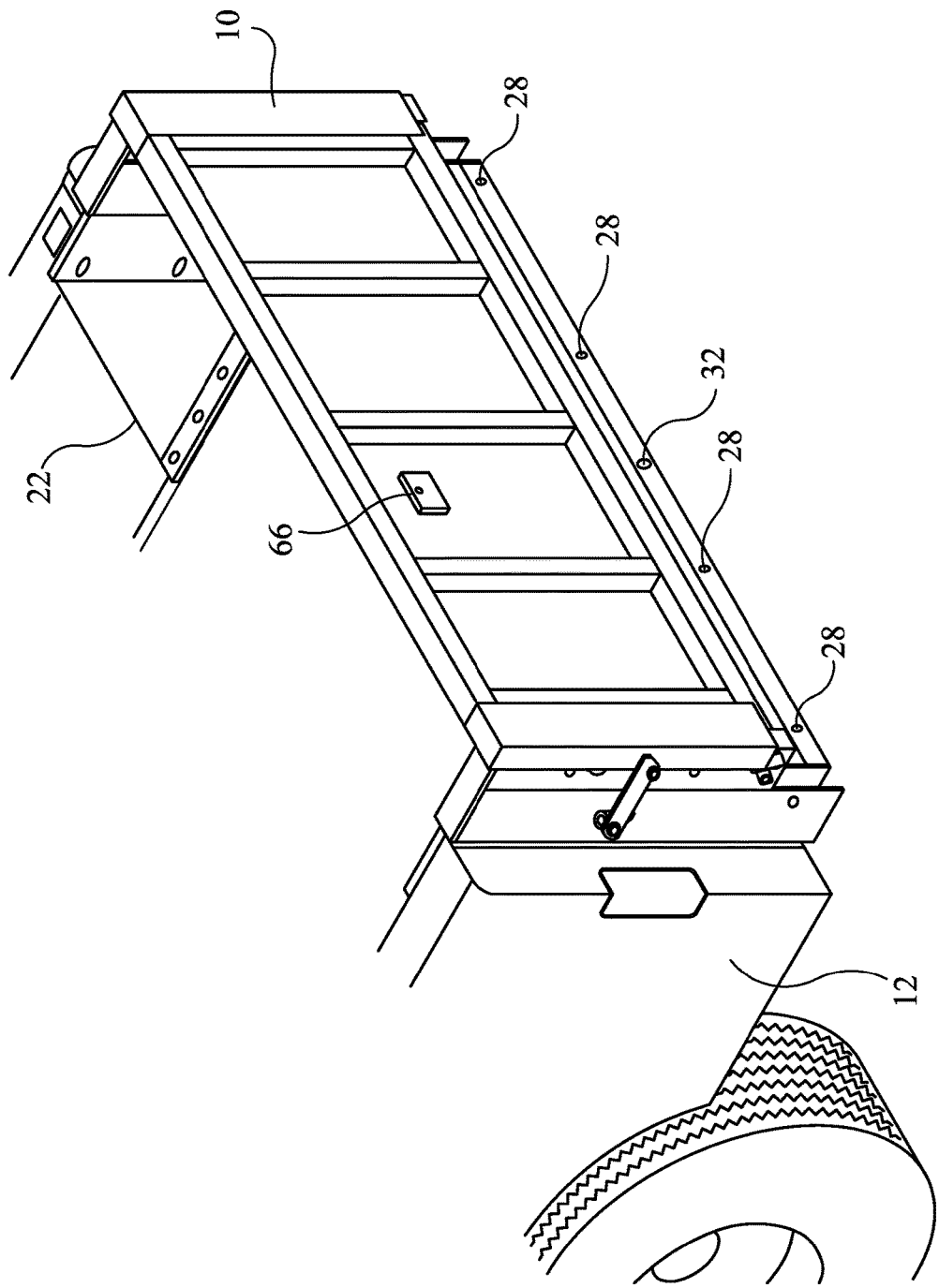
FIG. 7 is a rear perspective view of an alternative embodiment of a vehicle equipped with a liftgate and modular sensor housing incorporating features of the present invention.

In an alternative embodiment as shown in FIG. 7, where the vehicle backup camera is mounted originally in the tailgate of the vehicle and would display an incorrect perspective if mounted below the liftgate, or if for other reasons of incompatibility (e.g. with the vehicle software) the camera cannot be mounted to the modular sensor housing an additional camera mount 66 may be provided directly to the underside of liftgate 10.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment the sensor brackets are formed into structural angles to accommodate the sensors from a Chevrolet truck, other brackets formed into shapes uniquely suited to the sensors from a Ford, Dodge, Toyota or other vehicle are contemplated within the scope of the invention, provided each is compatible with the modular sensor housing. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. A method of attaching a liftgate to a vehicle, the vehicle having a tailgate and a rear bumper, the vehicle further having an original equipment camera mounted in a camera mounting location in the tailgate or the bumper, the camera having an external configuration, the method comprising the steps of:

providing a vehicle liftgate having a liftgate frame and a modular sensor housing, the modular sensor housing being attached to a lower portion of the liftgate frame and spanning the majority of the width of the liftgate;

detaching the camera from the camera mounting location;

removing the vehicle bumper and tailgate from the vehicle;

attaching the liftgate frame to the vehicle;

attaching the camera to a camera bracket, the camera bracket having an aperture sized and shaped to match the external configuration of the camera and a flange for mounting the camera bracket to the modular sensor housing; and mounting the camera bracket to the modular sensor housing.

2. The method of claim 1, further comprising the steps of:
detaching a proximity sensor from the vehicle bumper;
attaching the proximity sensor to a proximity sensor mounting bracket, the proximity sensor mounting bracket having an aperture sized and shaped to match an external configuration of the proximity sensor; and
mounting the proximity sensor mounting bracket to the modular sensor housing.

3. The method of claim 1, wherein:
the modular sensor housing comprises an elongated channel having a plurality of apertures formed in the web portion thereof.

4. The method of claim 1, wherein:
the proximity sensor mounting bracket comprises a structural angle having a C-shaped aperture formed in a web portion thereof.

5. The method of claim 1, wherein:
the backup camera mounting bracket comprises a structural angle having an elongated aperture formed in a web portion thereof.

\* \* \* \* \*